(12) United States Patent
Ishida et al.

(10) Patent No.: US 8,505,442 B2
(45) Date of Patent: Aug. 13, 2013

(54) BEER FROTHING DEVICE

(75) Inventors: Hiroshi Ishida, Osaka (JP); Akihiko Uchida, Osaka (JP); Tomohiro Inoue, Nara (JP)

(73) Assignee: Lead Co., Ltd. (JP)

( * ) Notice: Subject to any disclaimer, the term of this patent is extended or adjusted under 35 U.S.C. 154(b) by 715 days.

(21) Appl. No.: 12/672,711

(22) PCT Filed: Mar. 25, 2008

(86) PCT No.: PCT/JP2008/055512
§ 371 (c)(1),
(2), (4) Date: Feb. 9, 2010

(87) PCT Pub. No.: WO2009/037879
PCT Pub. Date: Mar. 26, 2009

(65) Prior Publication Data
US 2011/0113973 A1    May 19, 2011

(30) Foreign Application Priority Data

Sep. 18, 2007 (JP) ................. 2007-241041

(51) Int. Cl.
*C12C 11/11* (2006.01)
*C12G 3/04* (2006.01)
*A47J 31/44* (2006.01)

(52) U.S. Cl.
CPC .............. *A47J 31/4496* (2013.01); *C12G 3/04* (2013.01)
USPC .............. 99/323.1; 99/275; 99/323.2; 222/3; 222/4; 222/14; 222/20; 222/52; 222/146.6

(58) Field of Classification Search
CPC ................ A47J 31/4496; C12G 3/04
USPC .............. 99/275, 323.1, 323.2; 222/3, 4, 222/14, 20, 52, 146.6
See application file for complete search history.

(56) References Cited

U.S. PATENT DOCUMENTS 4,111,243 A * 9/1978 Fetterman .............. 141/102
4,304,272 A * 12/1981 Golding ................. 141/92

(Continued)

FOREIGN PATENT DOCUMENTS

JP     01-258784     10/1989

(Continued)

OTHER PUBLICATIONS

PCT, International Search Report (including English translation), International Application No. PCT/JP2008/055512; 10 pages (dated Apr. 22, 2008; published Mar. 26, 2009).

(Continued)

*Primary Examiner* — Gene Kim
*Assistant Examiner* — Alexander Niconovich
(74) *Attorney, Agent, or Firm* — Thompson Hine L.L.P.

(57) ABSTRACT

A beer frothing device for stably generating froth without degrading beer quality is provided. The device frothing beer in a vessel by squirting a pressurized gas through a nozzle submerged in the beer, includes a pressurized gas supply, a squirting mechanism, connected to the gas supply and having a cutoff valve to obstruct the gas squirting through the nozzle, a lifting mechanism for supporting the squirting mechanism during its vertically reciprocating up-and-down movement with a half track between a start point where the nozzle is positioned right above the vessel and a lower point where the nozzle is submerged at a predetermined depth in the beer, a start switch for lowering the lifting mechanism, a direction change switch for raising the lifting mechanism when the lower point is detected during lowering operation, a stop switch for stopping the lifting mechanism when the start point is detected during rising operation, and an open-valve switch, arranged between the direction change switch and the stop switch, for opening the cutoff valve to detect an appropriate position where the nozzle is submerged in the beer. The direction change switch and the stop switch make a limit switch.

16 Claims, 12 Drawing Sheets

(56) References Cited

U.S. PATENT DOCUMENTS

| | | | |
|---|---|---|---|
| 4,342,710 A * | 8/1982 | Adolfsson et al. | 261/121.1 |
| 4,560,089 A * | 12/1985 | McMillin et al. | 222/14 |
| 4,895,194 A * | 1/1990 | McCann et al. | 141/198 |
| 4,944,332 A * | 7/1990 | Belland | 141/1 |
| 4,974,643 A * | 12/1990 | Bennett et al. | 141/1 |
| 5,022,557 A * | 6/1991 | Turner | 222/54 |
| 5,115,841 A * | 5/1992 | Horino et al. | 141/250 |
| 5,431,302 A * | 7/1995 | Tulley et al. | 222/14 |
| 5,538,028 A * | 7/1996 | Lombardo | 137/12.5 |
| 5,667,832 A * | 9/1997 | Tromans | 426/394 |
| 6,230,767 B1 * | 5/2001 | Nelson | 141/264 |
| 6,234,222 B1 * | 5/2001 | Nelson | 141/264 |
| 6,234,223 B1 * | 5/2001 | Nelson | 141/264 |
| 6,237,652 B1 * | 5/2001 | Nelson | 141/263 |
| 6,276,150 B1 * | 8/2001 | Nelson | 62/177 |
| 6,397,909 B1 * | 6/2002 | Nelson | 141/356 |
| 6,401,598 B1 * | 6/2002 | Tavlarides | 99/323.2 |
| 6,439,434 B2 * | 8/2002 | Johansson et al. | 222/146.6 |
| 6,443,335 B1 * | 9/2002 | Pinedjian et al. | 222/504 |
| 6,669,051 B1 * | 12/2003 | Phallen et al. | 222/1 |
| 6,695,168 B2 * | 2/2004 | Pinedjian et al. | 222/54 |
| 6,702,159 B2 * | 3/2004 | Itou et al. | 222/400.7 |
| 7,032,781 B2 * | 4/2006 | Van Der Klaauw et al. | 222/146.6 |
| 7,040,359 B2 * | 5/2006 | Younkle | 141/255 |
| 7,188,751 B2 * | 3/2007 | Van Der Klaauw et al. | 222/146.6 |
| 7,278,454 B2 * | 10/2007 | Younkle | 141/374 |
| 7,753,231 B2 * | 7/2010 | Giles et al. | 222/14 |
| 7,810,679 B2 * | 10/2010 | Wauters et al. | 222/399 |
| 7,823,411 B2 * | 11/2010 | Gagliano et al. | 62/390 |
| 7,958,815 B2 * | 6/2011 | Kodden et al. | 99/302 R |
| 8,162,011 B2 * | 4/2012 | Weems | 141/95 |
| 8,230,778 B2 * | 7/2012 | Piscaer et al. | 99/323.1 |
| 2006/0138177 A1 * | 6/2006 | Wauters et al. | 222/386.5 |
| 2006/0157515 A1 * | 7/2006 | Oswald | 222/399 |
| 2008/0187632 A1 * | 8/2008 | Smith et al. | 426/112 |

FOREIGN PATENT DOCUMENTS

| | | |
|---|---|---|
| JP | 08-244894 | 9/1996 |
| JP | 10-287393 | 10/1998 |
| JP | 11-043197 | 2/1999 |
| JP | 2000-085894 | 3/2000 |
| JP | 2002-005015 | 1/2002 |
| JP | 2003-085641 | 3/2003 |
| JP | 2006-298461 | 11/2006 |

OTHER PUBLICATIONS

PCT, Written Opinion of the International Searching Authority, (including English translation), International Application No. PCT/JP2008/055512; 8 pages (dated Apr. 22, 2008).

PCT, International Preliminary Report on Patentability, International Application No. PCT/JP2008/055512, 9 pages (Apr. 15, 2010).

* cited by examiner

BEER FROTHING DEVICE

TECHNICAL FIELD

The present invention relates to a technique for generating froth by blowing carbon dioxide gas into beer and, more in detail, to a beer frothing device for automatically generating froth by simply setting a glass of beer or the like.

BACKGROUND ART

When people drink a glass or mug of beer, frothing beer is believed to be preferable in terms of taste and eye-pleasing point of view. An amount of froth should not be so large but not so small, and a ratio of froth of 7:3 is said to be ideal. At any rate, when beer is provided in business such as in restaurants, applying an appropriate amount of froth is essential to heighten commercial value of beer.

A large number of inventions have been developed to generate froth in beer. One of the currently available and typical techniques is a beer server machine which has a nozzle with two output openings, one for beer and the other for froth. A stopcock is opened to one side to allow beer to be fed to a glass or the like via a beer output spigot, and after filling the glass with beer, the stopcock is flipped to the opposite side to feed froth remaining in a dispenser via a froth output spigot. With this arrangement, froth feeding takes time because the remaining froth is fed at a very low pressure. A proper amount of froth cannot be obtained if the temperature of beer is very low, or depending on the frequency of beer servings.

A separate frothing device may be sometimes used to assist frothing. Known frothing devices include one for squirting mineral water into beer fed in a glass or the like (Patent Document 1) or one for squirting a gas (Patent Document 2).

Patent Document 1: Japanese Unexamined Patent Application Publication No. 2006-298461

Patent Document 2: Japanese Unexamined Patent Application Publication No. 2000-85894

DISCLOSURE OF INVENTION

Problems to be Solved by the Invention

The invention disclosed in Patent Document 1 relates to a frothing device originally intended for use with cans of beer or bottles of beer, and the structure of the frothing device allows the frothing device to be available for business use. Pressurized mineral water is squirted on the surface of poured beer, and even if a small amount of mineral water is used, the beer is practically mixed with water. Mixing beer with water is not preferable in view of maintaining components and quality of beer.

On the other hand, the invention disclosed in Patent Document 2 is related to a method of squirting a gas onto beer, and beer is not subjected to dilution or other process as the method disclosed in Patent Document 1. Since nitrogen gas is used as a gas to be squirted, a nitrogen gas cylinder is also needed in addition to a carbon dioxide gas cylinder usually used together with a beer server machine. Additional costs become necessary. Since the nitrogen gas cylinder is a hand-type, a user handles with the nozzle thereof manually held. A uniform submerge depth of the nozzle into the beer and a uniform squirt time are difficult to achieve. Guesswork must be applied to generate quickly an appropriate amount of froth. A relatively high level of skill is needed.

The present invention has been developed in view of the above problems, and it is an object of the present invention to provide a beer frothing device that stably generates froth without degrading beer quality.

Means for Solving the Problems

To achieve the above object, a beer frothing device of the present invention for frothing beer poured in a vessel by squirting a pressurized gas through a nozzle into the beer with the nozzle submerged in the beer, includes a pressurized gas supply, a squirting mechanism, connected to the gas supply and having the nozzle for squirting the gas, a lifting mechanism for supporting the squirting mechanism in a manner such that the squirting mechanism is raised and lowered in a vertically reciprocating movement with a half track between a start point at which the nozzle is positioned right above the vessel and a lower point at which the nozzle is submerged at a predetermined depth in the beer, a start switch for lowering the lifting mechanism, and a cutoff valve for cutting off, in a normally closed state, the squirting of the gas through the nozzle, and being ready to open when the nozzle reaches a preset submerge position in the beer in the movement of the lifting mechanism.

The pressurized gas used in the above-described arrangement is squirted into the beer at a predetermined pressure during the submerging operation of the nozzle to froth the beer. The pressurized gas may be a carbon dioxide gas, a nitrogen gas, a mixture of these gases, or air, and is not particularly limited to any gas as long as the gas does not adversely affect the quality of beer and human bodies. The nozzle squirting the pressurized gas is contained in the squirting mechanism, and the squirting mechanism is supported by the lifting mechanism so that the squirting mechanism reciprocates vertically in accordance with the present invention. The squirting mechanism is initially at the start point where the nozzle is clear of the vessel. With the start switch turned on, the squirting mechanism is operated by the lifting mechanism in the order of a lowering operation→a raising operation→a stop state, and in the course of these operations, the normally closed cutoff valve is opened at a preset submerge position of the nozzle in the beer so that the gas is automatically introduced.

The cutoff valve in the above arrangement is not limited to any particular one and any one is acceptable as long as the cutoff valve cuts off gas squirting through the nozzle in the normally closed state. For example, the cutoff valve may be an electromagnetic valve. In order to open the electromagnetic valve at the moment the preset submerge depth in the beer is reached, another electric circuit memorizing the preset depth may be used, or a position detection signal from a photoelectric sensor or a limit switch may be used as a trigger. Therefore, if the cutoff valve is constructed of an electromagnetic vale, a simple control circuit can control the cutoff valve. Considering that the frothing device is typically used in kitchens where humidity is high and temperature variations are extreme, the device structure is preferably environmental resistant. The cutoff valve may be separate from the squirting mechanism. Alternatively, the cutoff valve may be integrated with the squirting mechanism into a unitary body. Such an arrangement is preferable since the positional relationship of the cutoff valve to the nozzle is fixed, and an open-close passage for squirting the gas is reliably established.

In accordance with the present invention, the cutoff valve and the nozzle are contained in the squirting mechanism and an open-close lever protruding in the reciprocating track of the squirting mechanism is arranged in the cutoff valve. An open-valve switch is arranged in a manner such that the open-valve switch opens the cutoff valve when the open-valve switch is placed into contact with the lever. Since this arrangement causes a mechanical contact of the open-valve switch to operate the cutoff valve, response characteristics are high and erratic operations are less than when the electromagnetic valve is electrically controlled. In a more specific arrangement, the cutoff valve is normally closed by expandable urging and the open-valve switch preferably opens the cutoff valve against the expandable urging only when the open-valve switch is placed into contact with the lever. With this arrangement, the mounting position of the open-valve switch determines the timing at which the open-valve switch physically touches the lever, i.e., the timing of the gas squirting. The contact time of the open-valve switch to the lever is determined by the lifting speed and the vertical length of the open-valve switch. Given the constant lifting speed, the squirting time is substantially set by the vertical length of the open-valve switch. If the length of the open-valve switch is sufficiently large, and the lever contact time is sufficiently long, the gas is squirted into the beer intermittently for a duration of time during which the nozzle is submerged in the beer.

As another arrangement for opening and closing the cutoff valve in response to a physical contact, the cutoff valve is opened by toggling up and down the lever and the open-valve switch is placed into contact with the lever once during the lowering operation of the squirting mechanism and once during the raising operation of the squirting mechanism to open and close the cutoff valve. In this arrangement, a closed line is set with the lever initially toggled down, and the lever is put into contact with the open-valve switch in the approach track in the lower operation, and then is toggled up into an upper position. The squirting mechanism begins to squirt the gas. In the return track in the raising operation after change of direction, the lever is put into contact again with the open-valve switch, and toggled down into a lower position thereof. The squirting operation thus stops. Given a constant lifting speed in this arrangement, the duration of time and timing of gas squirting are determined based on a distance between a direction change switch and the open-valve switch.

Since the lever can be manually operated in any opening and closing means, the user can manually froth beer as necessary without operating the lifting mechanism.

In another arrangement, a cutoff valve includes a nozzle having a leading end opened, a trailing end closed and a circular wall with a valve orifice formed in part thereof, and a valve casing having a slide hole allowing the nozzle to pass therethrough in an air-tight manner and a gas passage opened to the slide hole in a manner communicable with the valve orifice.

A hydraulic system may be contemplated as a specific structure of the lifting mechanism, but an electric motor is easy in structure as a driving source. When the electric motor is used as a driving source, two methods are available. In one method, the squirting mechanism is reciprocated by switching the rotation direction of the motor between a normal direction and a reverse direction and in the other method, the squirting mechanism is reciprocated with a cam and a traverse gear even if the electric motor is rotated in one direction only. One of the two methods may be employed. In the former method of switching the direction of the rotation of the motor between the normal direction and the reverse direction, the timing of switching is important. In each of the two methods, the timing of switching off the raising operation in the return track is important. These timings are set by detecting the moment the squirting mechanism reaches the lower point and the start point. The detection method of the present invention uses a direction change switch for detecting the lower point in the course of the lowering operation of the squirting mechanism and then raising the lifting mechanism, and a stop switch for detecting the start point in the raising operation and stopping the lifting mechanism. As a specific structure, a contact type and a non-contact type are contemplated for the direction change switch and the stop switch. The contact types include a limit switch and a pressure sensor, each outputting a signal in response to a physical contact with the squirting mechanism in the raising and lowering operations, and the non-contact types include a photoelectric sensor and a ultrasonic sensor in the raising and lowering operations. The present invention is not limited to any type. Considering that the frothing device is typically used in kitchens where humidity is high and temperature variations are extreme, the use of the limit switch is preferable. The limit switch is a tightly sealed micro-switch having environmental high-resistance. The effect of temperature variations on response characteristics of the switch is small. Due to the compact size of the switch, the device size is also reduced. The limit switch is controlled by a very simple control circuit, and the device may be introduced at low costs. When the limit switch is used, an actuator is protruded into the reciprocating track of the squirting mechanism. By causing the squirting mechanism to be in contact with the actuator, a signal is output.

In accordance with the invention, beer poured in a vessel is frothed. The vessel herein refers to a vessel for beverage having an opening on the top thereof, such as a glass, a jug, or a cup, and a specific shape and material of the vessel are not important. A quantity of beer depends on the size of the vessel. In response to the quantity of beer, at least one of the direction change switch, the stop switch, and the open-valve switch is preferably adjustable in a height position thereof.

If there is an obstacle below the nozzle, the squirting mechanism including the nozzle or the lifting mechanism may be damaged due to contact with the obstacle. In accordance with the present invention, the squirting mechanism includes a nozzle that proceeds or recedes in an expandable manner. If the nozzle is put into contact with the obstacle, the nozzle absorbs impact by receding in an expandable manner.

On the other hand, the squirting mechanism and the lifting mechanism are housed in a casing supported by an arm that stands on a base on which the vessel is placed. With this arrangement, the device becomes compact, and is appealing in the design point of view. The start switch may be a detector sensor of the vessel arranged on the base or the arm. The base may be provided with a light emitter.

The gas for use in an existing beer server machine is branched, and the branched gas is depressurized. The depressurized gas is then used as a source of a pressurized gas for the frothing device. The gas supply source is thus shared by the frothing device and the beer server machine. Such an arrangement is economical and rational in structure. However, it is also perfectly acceptable that a dedicated gas supply is prepared for the device of the present invention.

In contrast, an accordion-type air pump may be used for a pressurized gas supply. The air pump forces air into the lifting mechanism in step with the lowering operation of the lifting mechanism.

Advantages

In accordance with the present invention, the quality of beer is not destroyed since the beer is frothed by squirting the gas. The user simply sets a glass or the like and presses the start switch, and the device automatically sets (submerges) the nozzle in the beer and squirts the gas into the beer. The frothing operation is no time-consuming. Even an inexperienced person can provide uniform frothing easily and reliably. Since the cutoff valve has a simple structure having a closed supply line maintained in an expandable manner, and is easily switched by toggling up or down the lever, the device can be introduced at low costs. The use of the limit switch as a position detector provides environment resistance while maintaining a constant detection accuracy level. The position detection is easy. By adjusting the height position of the open-valve switch at an appropriate position, vessels of a variety of sizes are handled, and the squirt time of the gas is easily modified.

REFERENCE NUMERALS

Figure 1:
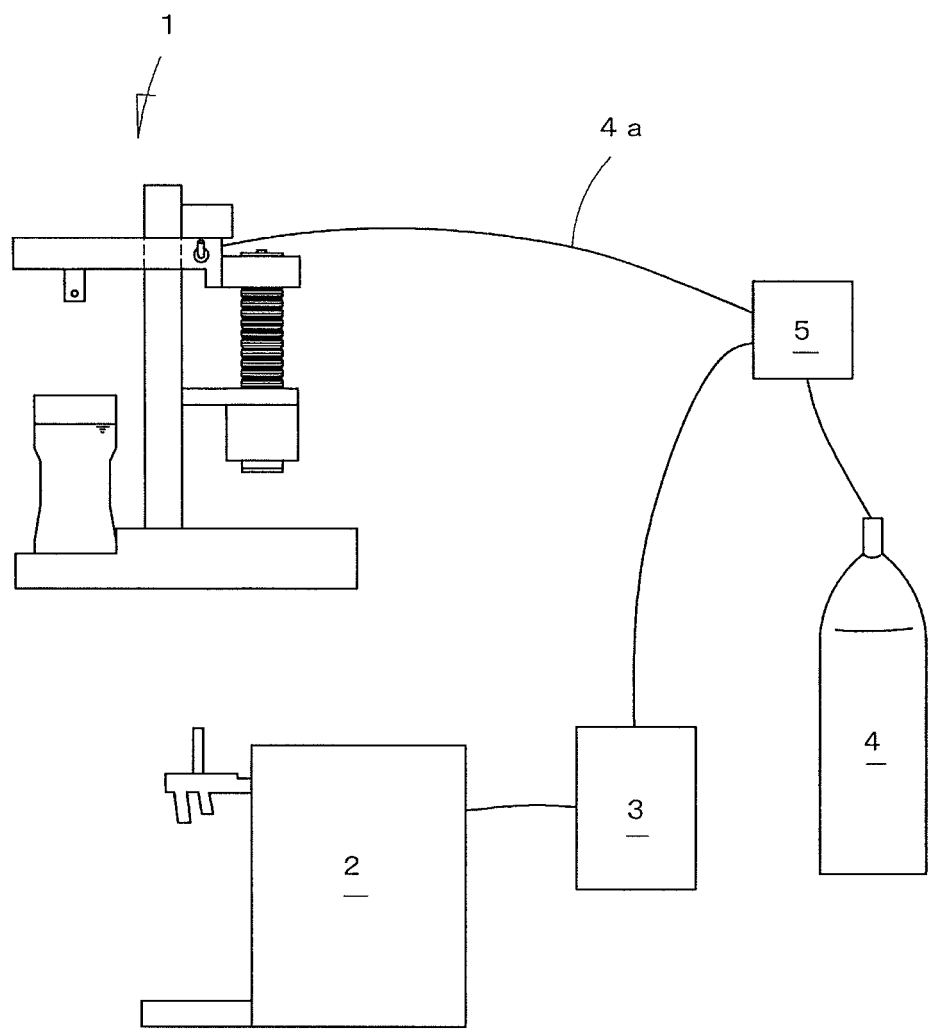
FIG. 1 is a schematic diagram diagrammatically illustrating an entire beer server system in which a device of the present invention is installed.

1 Frothing device
2 Existing beer server machine
3 Beer keg
4 Carbon dioxide cylinder
5 Pressure reducing valve
C Vessel
10 Placement base
11 Lifting mechanism
11c Electric motor
12 Squirting mechanism
12b Nozzle
13 Gas passage
14 Cutoff valve
15 Start switch
16 Limit switch (detector of start point)
17 Limit switch (detector of lower point)
18 Open-valve switch

BEST MODE FOR CARRYING OUT THE INVENTION

The preferred embodiments of the present invention are described below with reference to the drawings. First, FIG. 1 illustrates an installation example of the present invention. Referring to FIG. 1, there are shown a frothing device 1, an existing beer server machine 2, a beer keg 3 connected to the beer server machine 2, and a carbon dioxide cylinder 4. The carbon dioxide cylinder 4 is connected to the beer keg 3 and the connection of the carbon dioxide cylinder 4 is branched with a branch line 4a thereof connected the frothing device 1. A pressure reducing valve reduces the supply gas pressure of the carbon dioxide cylinder 4 to a set pressure. In this embodiment, the pressure reducing valve 5 of one-input and two-output type is arranged at a branch point, and reduces the supply gas pressure to different pressures for the beer keg 3 and the frothing device 1. More specifically, the pressure reducing valve 5 sets the pressure to the beer keg 3 so that beer is supplied to the existing beer server machine 2. The pressure reducing valve 5 reduces the pressure to the frothing device 1 needed for frothing beer. With this installation, the single carbon dioxide cylinder 4 allows the gas supply source to be shared by the frothing device 1 and the beer server machine 2.

In succession, one embodiment as a specific structure of the frothing device 1 is described below with reference to FIGS. 2-5. In a general structure, a lifting mechanism 11 is arranged on a placement base 10 on which a vessel C such as a glass or a jug is placed. The lifting mechanism supports a squirting mechanism 12 above the placement base 10 in a manner such that the squirting mechanism 12 is movable in a vertically reciprocating fashion between an upper position and a lower position defined by the lifting mechanism 11.

Figure 2:
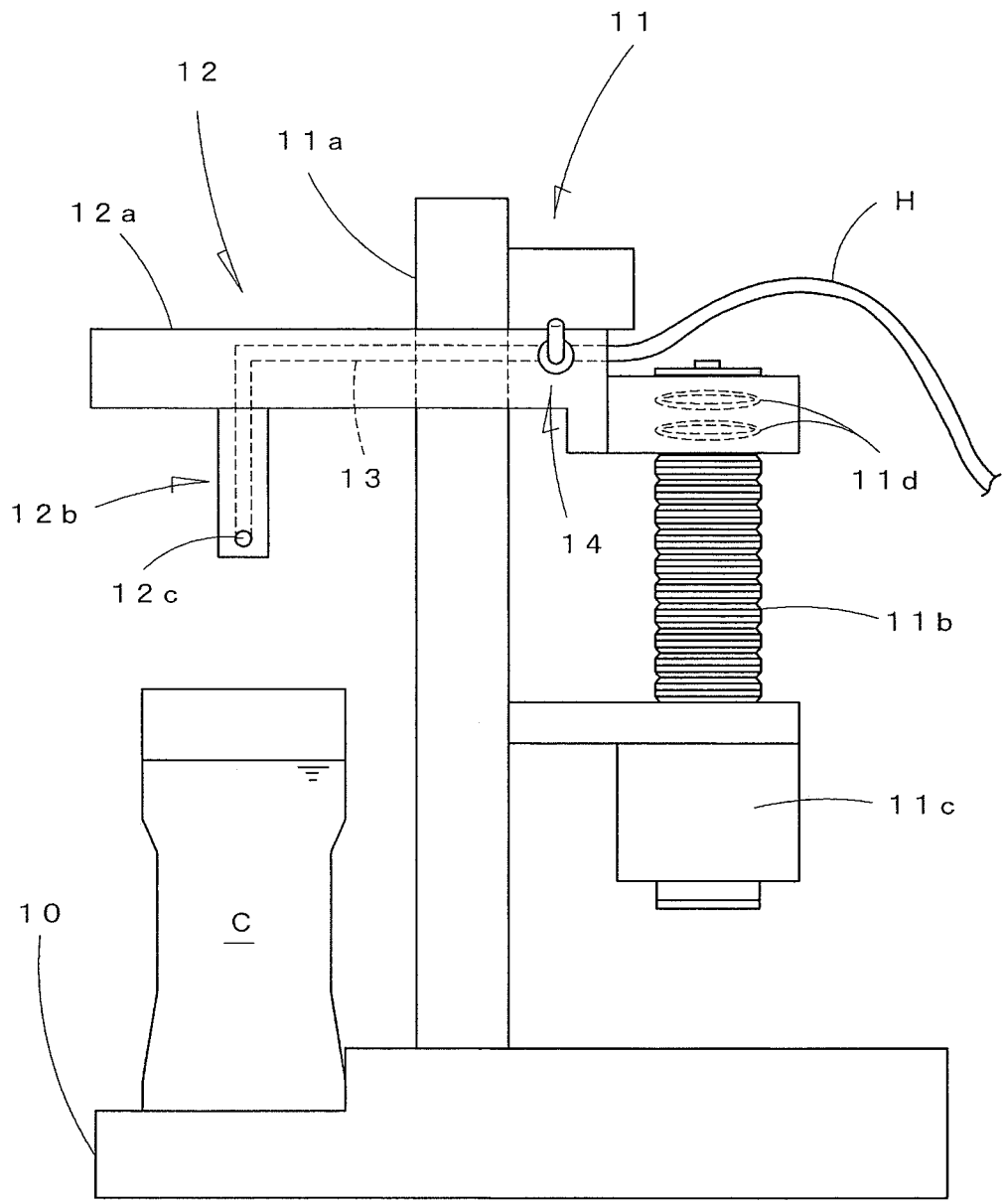
FIG. 2 is a side view (start point) of a beer frothing device in accordance with one embodiment of the present invention.
Figure 3:
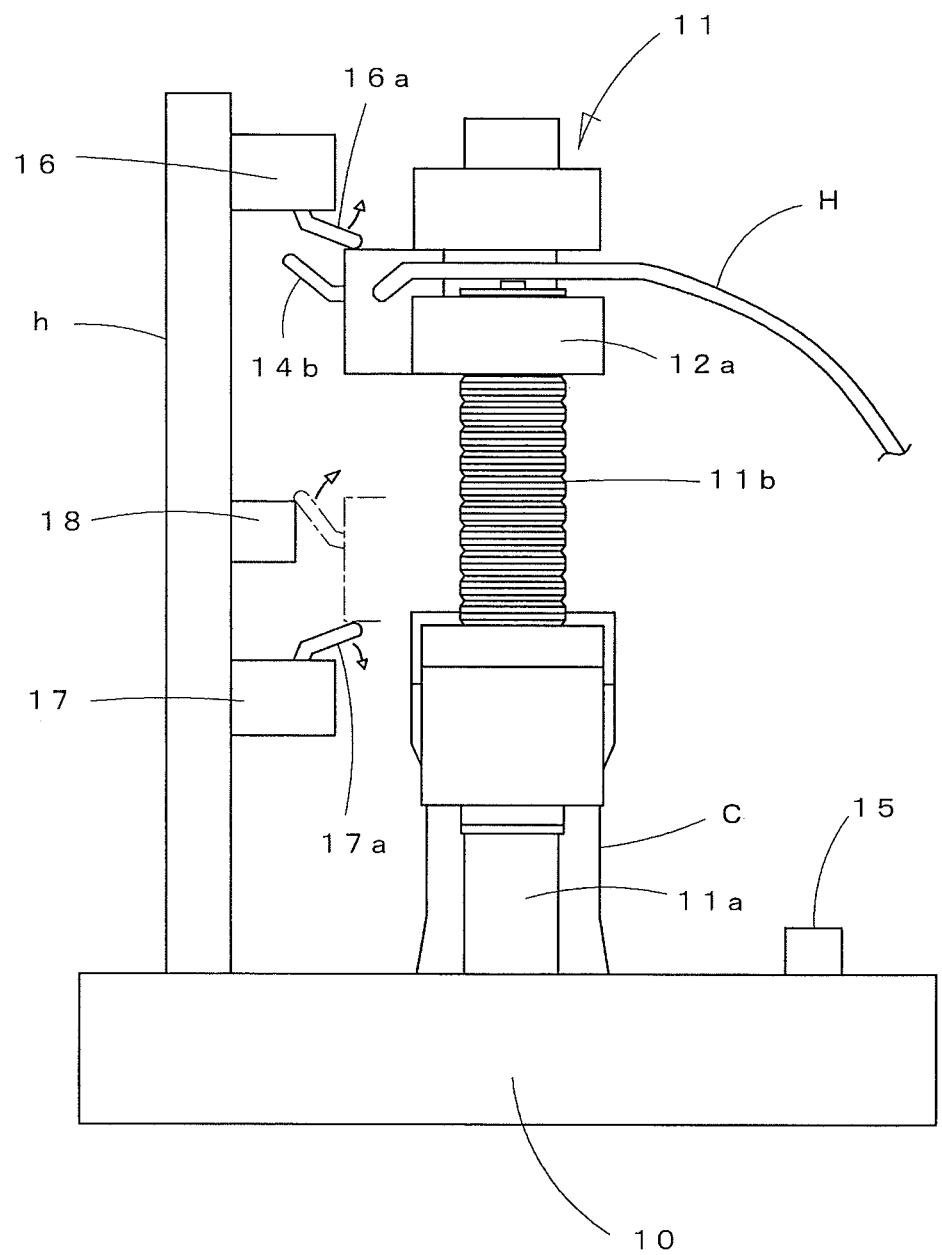
FIG. 3 is a side view (lower point) of the device.
Figure 4:
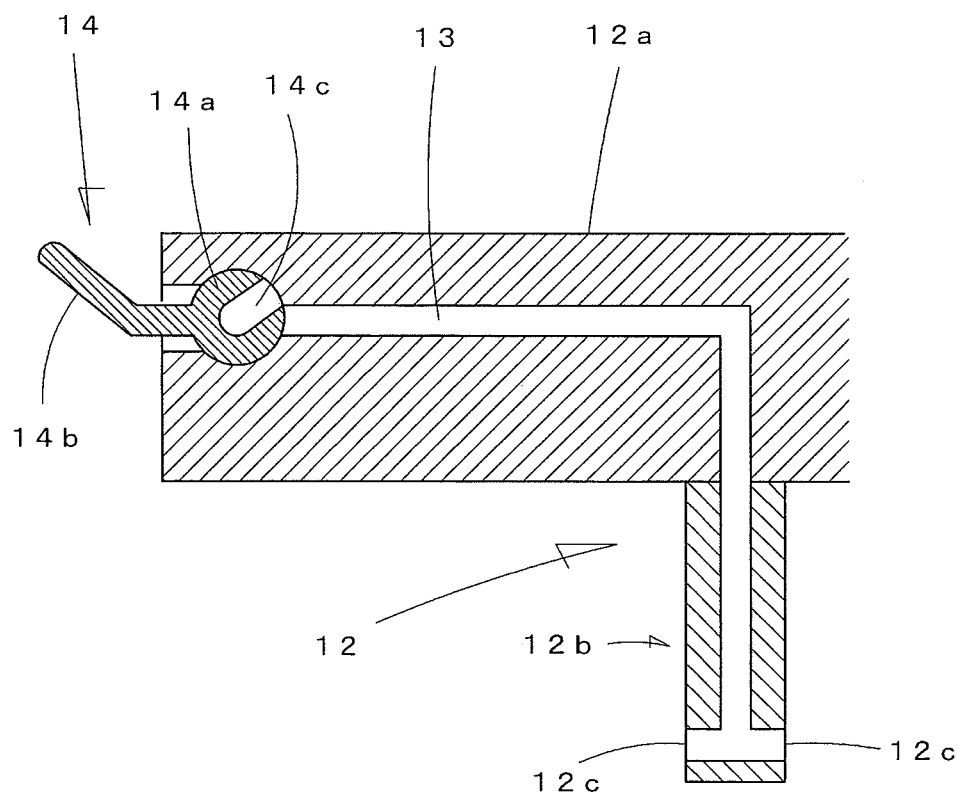
FIG. 4 is a sectional view diagrammatically illustrating a lever-type cutoff valve of the device.
Figure 5:
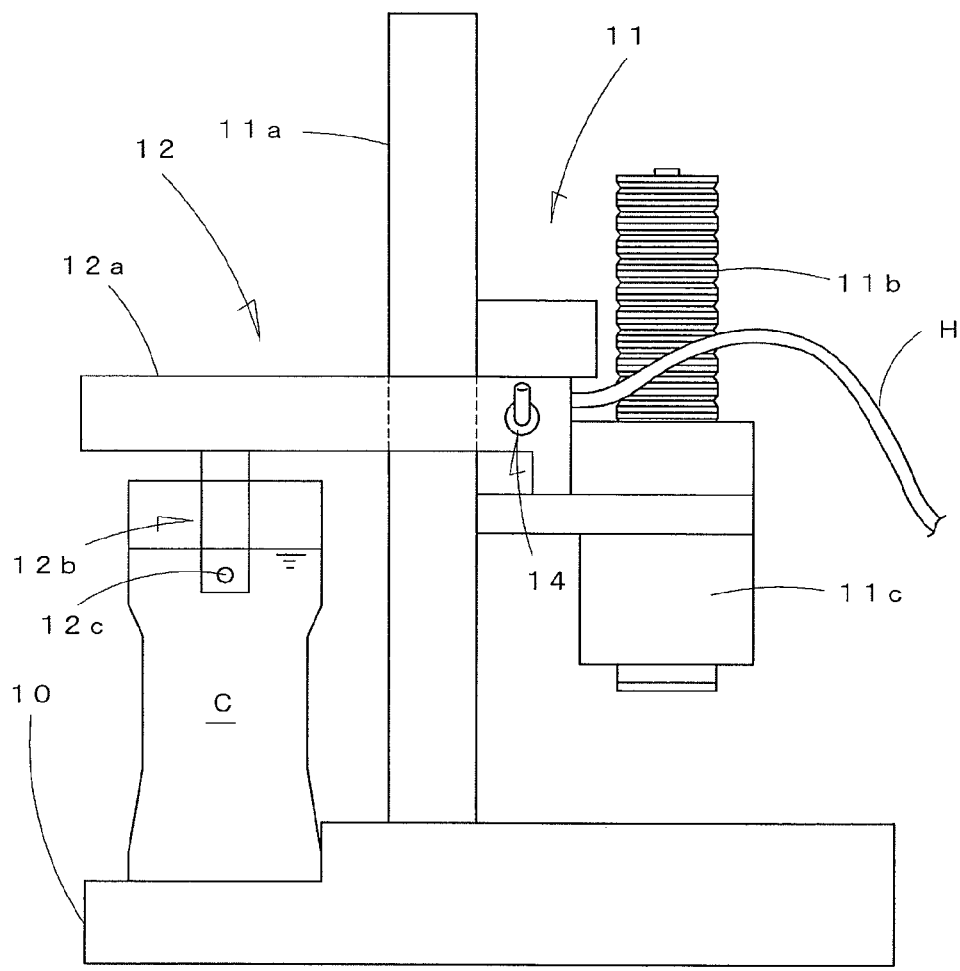
FIG. 5 is a rear view (start point) of the device.

More in detail, the lifting mechanism 11 includes a stand 11a vertically extending from a rear portion of the placement base 10 mainly illustrated in FIGS. 2 and 3, and a threaded bar 11b extending vertically in parallel with and behind the stand 11a. The threaded bar 11b is rotated in both clockwise and counterclockwise directions by a electric motor 11c as a driving source. A main portion 12a of the squirting mechanism 12 horizontally extends and connects to the stand 11a and the threaded bar 11b. The stand 11a is slidably inserted through an approximate center of the main portion 12a of the squirting mechanism 12. The threaded bar 11b is threadably connected with a rear portion of the main portion 12a. The squirting mechanism 12, unable to rotate about the stand 11a as an axis and horizontal with the stand 11a as a guide, vertically reciprocates in step with the thread advance of the threaded bar 11b rotated by the electric motor 11c as a driving source. More specifically, by controlling the direction of the rotation of the electric motor 11c, the vertical reciprocal movement of the squirting mechanism 12 is controlled. Bearings 11d reduce friction in thread portions between the main portion 12a and the threaded bar 11b so that the main portion 12a is smoothly reciprocated vertically.

A downward looking nozzle 12b is fixed on the bottom surface of the end of the main portion 12a of the squirting mechanism 12 supported by the lifting mechanism 11 as described above. The nozzle 12b is vertically movable in a reciprocating fashion by the lifting mechanism 11. In accordance with this embodiment, the nozzle 12b has a gas squirting orifice 12c on the lower side face thereof. A carbon dioxide gas is squirted through the squirting orifice 12c. The squirting orifice 12c may be arranged on the bottom end of the nozzle 12b. The squirting orifice 12c may be meshed to form multiple fine orifices so that the gas is squirted in radially arranged fine jets.

A gas passage 13 communicating with the nozzle 12b is arranged within the main portion 12a. A gas hose H branched off the carbon dioxide cylinder 4 is connected to the nozzle 12b via the gas passage 13.

Furthermore, the main portion 12a includes a cutoff valve 14 that opens and closes the gas passage 13. As discussed in detail with reference to FIG. 4, the cutoff valve 14 is a lever-switched type and includes a spherical valve plug 14a rotatably supported within the gas passage 13 and a lever 14b rigidly connected to the valve plug 14a and protruded into a reciprocating track of the squirting mechanism 12. A valve passage 14c functioning a supply line connecting the nozzle 12b and the gas passage 13 is formed in the valve plug 14a. When the lever 14b is operated, the gas passage 13 is opened or closed. In accordance with the present embodiment, one of the valve plug 14a and the lever 14b is urged in an expandable manner by an expandable member such as an unshown spring so that the gas passage 13 is normally closed. Therefore, the gas squirting from the nozzle 12b is normally stopped. Only when the lever 14b is operated against the expandable urging, the gas squirting is effected.

As described above, the squirting mechanism 12 controls the reciprocating movement of the lifting mechanism 11 by controlling the electric motor 11c on the lifting mechanism 11. In accordance with the present embodiment, as mainly illustrated in FIG. 5, an electrical circuit including a start switch 15 and two limit switches 16 and 17 arranged at an upper position and a lower position along the lifting mechanism 11 controls the electric motor 11c. A circuit board of the electrical circuit may be arranged conveniently at any appropriate location within the placement base 10 if the circuit board is in a water-tight and dust-proof state although such a state is not distinctly illustrated. The start switch 15 is used to cause the electric motor 11c to rotate in a direction that cause the lifting mechanism 11 to move in a downward direction at an initial step. In contrast, each of the limit switch 16 (corresponding to direction change switch stated in claim 1) and the limit switch 17 (corresponding to stop switch stated in claim 1) is used to detect the position of the lifting mechanism 11. The upper limit switch 16 is installed at a position that allows the vessel C to be placed on the base 10, i.e., installed at a height (start point) that allows the nozzle 12b to be clear of the vessel C. The lower limit switch 17 is installed at a height (lower point) that allows the nozzle 12b to be submerged at a predetermined depth in the beer in the vessel C placed on the placement base 10. With this setup, any of the limit switches 16 and 17 and actuators 16a and 17a thereof allows the main portion 12a of the squirting mechanism 12 to be within a touchable range. Here, h represents a support plate to fix the limit switches 16 and 17 and an open-valve switch 18 to predetermined positions thereof. When the start switch 15 is turned on with this arrangement, the lifting mechanism 11 is lowered as described above. When the nozzle 12b is submerged to the predetermined depth in the beer, the main portion 12a is placed into contact with the limit switch 17 installed at the lower position. An electrical signal output from the limit switch 17 causes the electric motor 11c to rotate in a reverse direction in direction change control. The direction change control causes the squirting mechanism 12 to change the direction of movement and is raised. The nozzle 12b rises above and clears of the beer, and moves until the main portion 12a is placed into contact with the limit switch 16 installed at the start point. An electrical signal of the limit switch 16 stops the electric motor 11c from rotating, and the lifting mechanism 11 from moving. A series of operation steps are thus completed.

In the above process, the nozzle 12b and the cutoff valve 14 are also raised. In accordance with the present embodiment, an arrangement discussed below is included in order to cause the nozzle 12b to squirt the carbon dioxide gas at a proper timing in the raise/lower operations. More specifically, as mainly illustrated in FIG. 3, the open-valve switch 18 is installed at a position that allows the nozzle 12b between the limit switches 16 and 17 to be submerged in the beer and to be ready for squirting the carbon dioxide gas and that allows the open-valve switch 18 to be enabled to be in contact with the lever 14b of the cutoff valve 14 in the raise/lower operations. While the lever 14b of the cutoff valve 14 remains to be in contact with the open-valve switch 18, the gas passage 13 is opened against the expandable urging and the carbon dioxide gas is squirted into the beer. If a further raising operation disengages the contact, the cutoff valve 14 automatically closes itself by the expandable urging, thereby stopping the squirting of the carbon dioxide gas. In this way, in accordance with the present embodiment, for a period of time corresponding to the contact time throughout which the open-valve switch 18 remains in contact with the lever 14b, the carbon dioxide gas is squirted into the beer from the nozzle 12b and the beer is properly frothed as a result.

Here, the contact time of the open-valve switch 18 with the lever 14b, i.e., the squirting time of the carbon dioxide gas is determined by the vertical length of the open-valve switch 18 if the lifting speed of the lifting mechanism 11 remains constant. If the vertical length of the open-valve switch 18 is sufficiently large, the lever 14b is intermittently in contact with the open-valve switch for a maximum period of time from when the squirting mechanism 12 is submerged in the beer to when the squirting mechanism 12 is raised and clear of the beer, and the carbon dioxide gas is continuously squirted into the beer for the longest period of time throughout which the squirting mechanism 12 remains submerged in the beer. However, in order to provide an appropriate amount of froth on the beer, the squirting time of the carbon dioxide gas is preferably set taking totally into consideration the volume and temperature of the beer, and the pressure of the carbon dioxide gas. This is because the appropriate amount of froth is also determined by the volume and temperature of the beer, and the pressure of the carbon dioxide gas.

In accordance with the above-described embodiment, the user simply sets the vessel C containing beer on the placement base 10, and turns on the start switch 15. The squirting mechanism 12 automatically vertically reciprocates between the start point and the lower point, completing the frothing operation.

The present invention is not limited to the above-described embodiment. For example, the gas supply may not be shared with an existing beer server machine. A dedicated compact gas cylinder may be separately prepared and used. Furthermore, a variety of changes are contemplated to the lifting mechanism, the position detector means of the lifting mechanism, the cutoff valve, and the open-valve switch of the cutoff valve. More specifically, one of a conveyor type, a suspension type, and other disclosed lifting means may be employed instead of the lifting mechanism of the threaded bar type using the electric motor as a driving source. A non-contact sensor such as a photoelectric sensor may be substituted for the limit switches 16 and 17.

Furthermore, the cutoff valve may be changed from the structure normally closed by the expandable member such as a spring to the structure having a passage opened and closed by simply toggling up and down a lever. In this case, however, the passage is closed when the lever is toggled down, and opened when the lever is toggled up. To operate the lever in such a switching operation, the open-valve switch needs to be arranged so that the lever is placed into contact once in the approach track (in the lowering operation) and once in the return track (in the raising operation).

Figure 6:
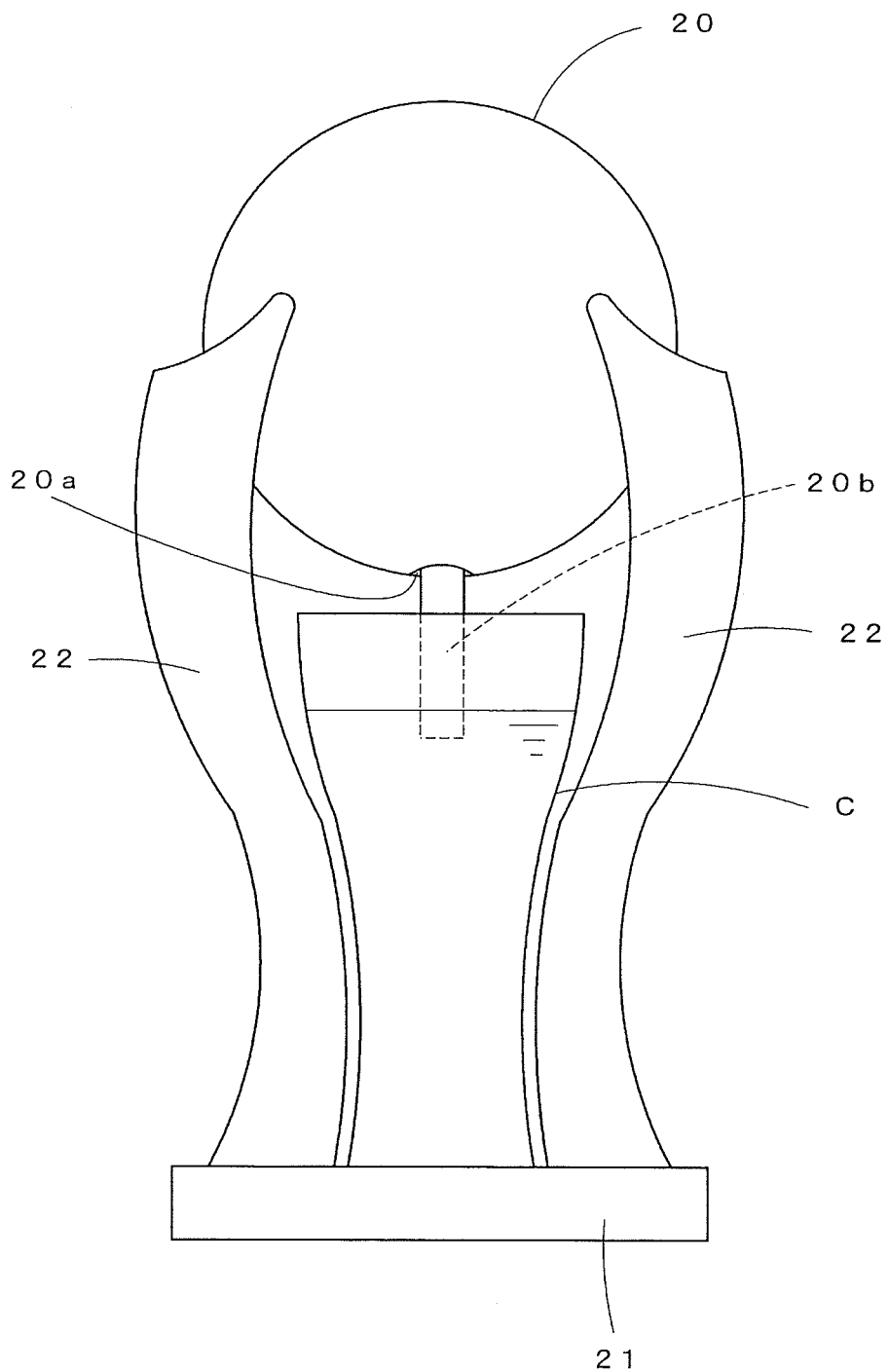
FIG. 6 is a front view of a frothing device in accordance with another embodiment of the present invention.

FIG. 6 illustrates another embodiment of the present invention, in which the squirting mechanism and the lifting mechanism are housed in a spherical casing 20. With the lifting mechanism driven by an unshown start switch, a nozzle 20b of the squirting mechanism is protruded through a nozzle hole 20a formed in the lower portion of the casing 20 and submerged into the beer to squirt the gas. The casing 20 is supported by a pair of left and right curved arms 22 standing on a placement base 21 of the vessel C. Even if the lifting mechanism is driven, the casing 20 is free from lifting.

Since the squirting mechanism and the lifting mechanism are housed in the casing 20 in the embodiment, the user is free from finger catching. The casing 20 is supported by the two arms 22, and the vessel C is placed between the two arms 22. This arrangement provides a compact design, and is appealing in the design point of view. The casing 20 and the arms 22 are not limited to the shapes illustrated herein. The casing 20 may have a cubical shape like a box, and the arms 22 may have a straight-bar like shape. Such configurations can still achieve the object of the present invention.

In accordance with the present embodiment, the internal structure of the casing 20, namely, the specific structure of the squirting mechanism and the lifting mechanism is not clearly illustrated in FIG. 6. The above-described structure may be housed as it is in the casing 20. The requirement of the present invention is that the nozzle be supported to be reciprocally movable from the start point right above the vessel to the lower point where the nozzle is submerged at a predetermined depth in the beer, and is that the cutoff valve normally closing the nozzle be opened at a predetermined submerge depth in the beer. The squirting mechanism and the lifting mechanism, different in structure, may be housed in the casing 20. Furthermore, the start switch may have a variety of structures different from the above-described embodiment. For example, a sensor for detecting the vessel C containing beer is installed on one of the placement base 21 and the arms 22, and a signal responsive to the detection of the vessel C by the sensor is used to drive the lifting mechanism.

Figure 7:
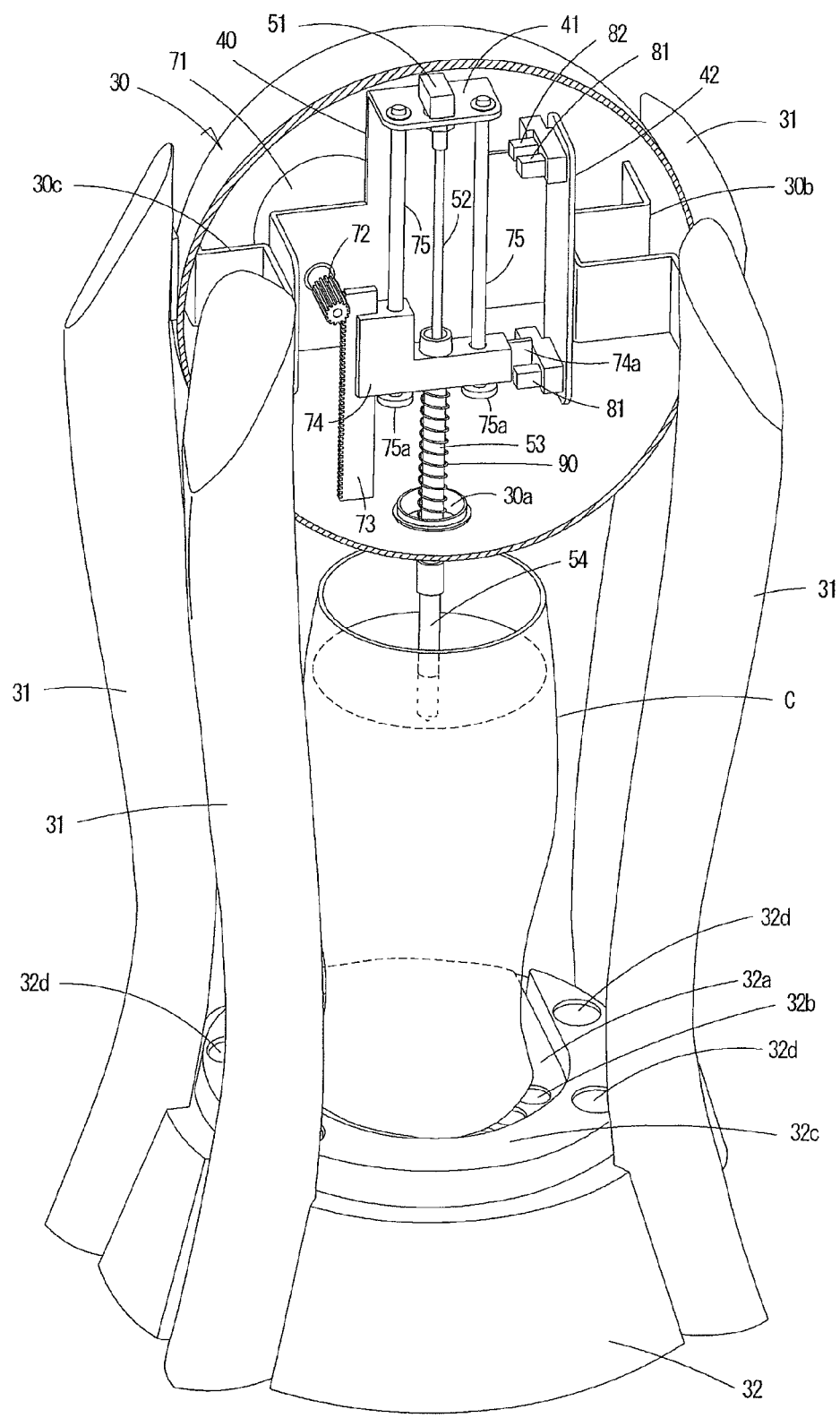
FIG. 7 is a perspective view of a frothing device of another embodiment in a more specific form of the above embodiment.

FIG. 7 illustrates another embodiment in a more specific form of the above-described embodiments. In accordance with the present embodiment, a spherical casing 30 is supported by four arms 31 ... 31. These arms 31 ... 31 stand with the lower ends thereof secured to the side of a truncated cone base 32. The base 32 has in the center top portion thereof a recess serving as a placement portion 32a. The placement portion 32a is formed of a mesh plate having a plurality of through-holes 32b. If a drink runs over the vessel C, the spill is drained through the through-holes 32b. A U-shaped portion 32c raised from the placement portion 32a includes light emitters 32d illuminating upward the casing 30 and the arms 31.

The base 32 and/or the arms 31 is provided with a sensor (not shown) detecting the presence or absence of the vessel C on the placement portion 32a. In the frothing device, the output signal of the vessel detection sensor is used to operate a lifting mechanism and a squirting mechanism to be discussed later. More specifically, the vessel detection sensor in the frothing device corresponds to the start switch. By simply placing the vessel C on the placement portion 32a, the frothing device automatically performs a frothing operation. The vessel detection sensor may be a known object detection sensor using a light ray such as infrared light, or an ultrasonic wave. Alternatively, a pressure sensor detecting the weight of the vessel C may be provided on the placement portion 32a and employed as the vessel detection sensor. It is also acceptable that a manually operated switch such as a push button or a lever is used as the start switch.

Next, the internal structure of the casing 30, i.e., the lifting mechanism and the squirting mechanism, is described in detail. First, the casing 30 is spherical as described above. The casing 30 may be formed by combining semispherical units into a spherical shape. The casing 30 may have a different shape. A nozzle insertion hole 30a to be discussed later is opened in the lower portion of the casing 30. The casing 30 is secured to the top portions of the arms 31 ... 31 with stays 30b and 30c having two foot portions. A support plate 40 is secured between the stays 30b and 30c, and a variety of mechanisms including the squirting mechanism and the lifting mechanism are mounted onto the support plate 40.

More specifically, the squirting mechanism includes a gas tube connector 51 secured to a top bent portion 41 extending from the support plate 40, an inner tube 52 connected to the gas tube connector 51 and vertically downwardly extending along an axis of the nozzle insertion hole 30a of the casing 30, an outer tube 53 that allows the inner tube 52 to pass therethrough in an air-tight fashion, and a nozzle 54 connected to the lower end of the outer tube 53. In the squirting mechanism thus constructed, a junction 51a of the gas tube connector 51 receives a gas tube 55 therearound as shown in FIG. 8, and connects the squirting mechanism to an unshown external gas supply via the gas tube 55.

Figure 8:
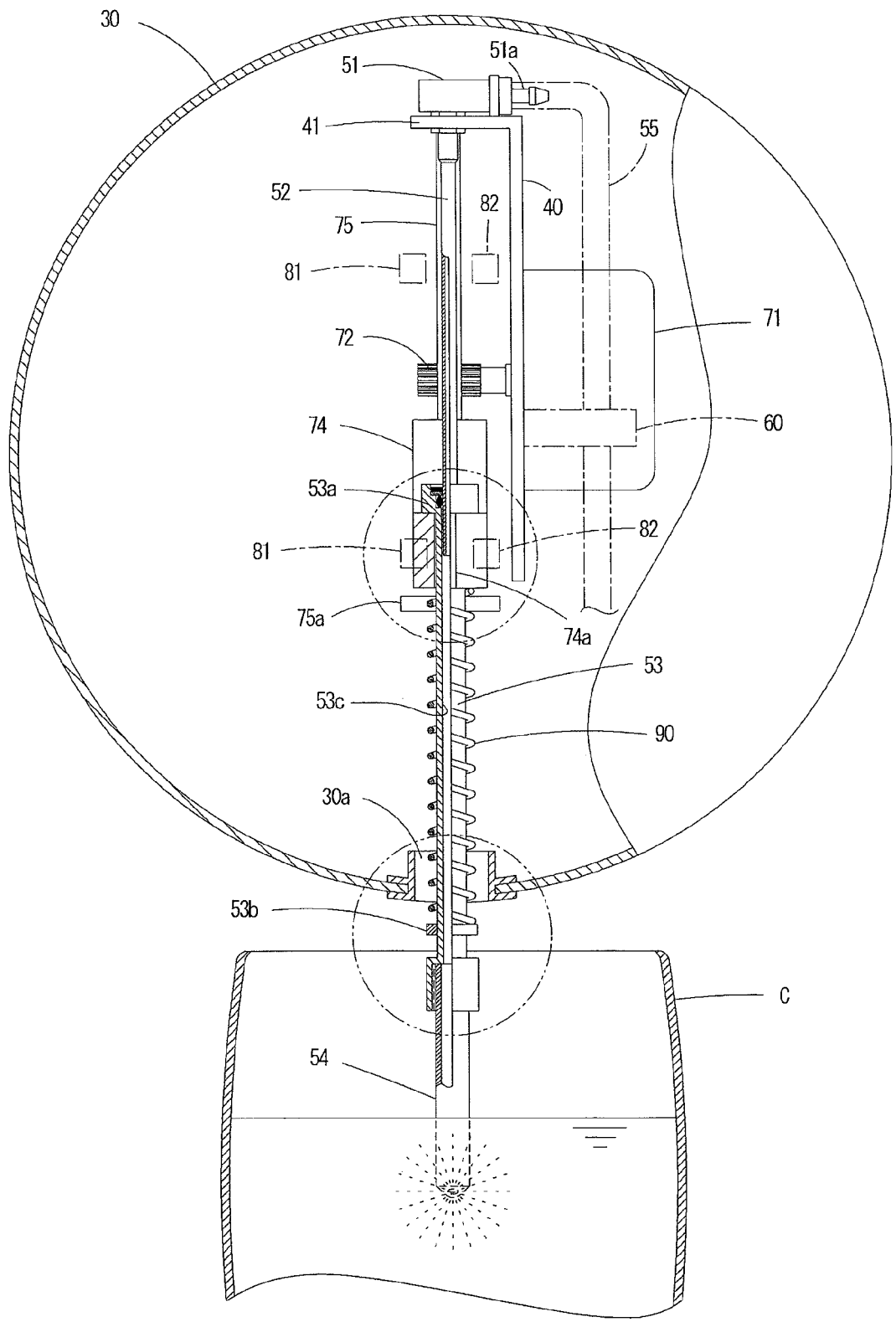
FIG. 8 is an expanded view of a major portion of the device.

Referring to FIG. 8, there is shown an electromagnetic valve 60 arranged on the rear side of the support plate 40. The electromagnetic valve 60 is typically a solenoid-type that drives a steel plunger by an electromagnet. The frothing device is designed to open and close the passage of the gas tube 55 with the plunger. The electromagnetic valve also switches between two states, namely, an entirely closed state and an entirely opened state. The passage of the gas tube 55 is normally closed.

Next, referring back to FIG. 7, the lifting mechanism includes a motor 71 serving as a driving source mounted side by side the electromagnetic valve 60 on the rear side of the support plate 40, a pinion 72 mounted on the rotary shaft of the motor 71 and protruding from the front side of the support plate 40, a rack 73, meshed with the pinion 72 on the front side of the support plate 40, for converting the rotation movement of the motor 71 into a linear vertical reciprocating movement, and a lifting arm 74, integrally connected to the rack 73, for vertically movably supporting the outer tube 53 of the squirting mechanism. Two guide bars 75 and 75, fixed on the top bent portion 41 of the support plate 40, extend in parallel with the squirting mechanism and pass through in the opposing sides of the lifting arm 74 with the outer tube 53 therebetween. The lifting arm 74 is vertically reliably movable along the guide bars 75 and 75. The guide bars 75 and 75 have the lower ends thereof stoppers 75a and 75a in order to prevent the lifting arm 74 from coming off.

The lifting arm 74 vertically movably supports the outer tube 53 of the squirting mechanism and the nozzle 54 mounted on the lower end of the outer tube 53. More specifically, the outer tube 53 is terminated with a flange 53a at the top end thereof as illustrated in FIG. 8. The outer tube 53 is slidably inserted until the flange 53a is engaged with the top surface of the lifting arm 74. A coil spring 90 is loaded around a barrel portion of the outer tube 53 downward protruding from the lifting arm 74, and the coil spring 90 is held between the bottom surface of the lifting arm 74 and a spring retainer 53b such as a washer integrally connected to the lower end of the outer tube 53 in a manner such that a predetermined expandable force is maintained. With this arrangement, the vertical movement of the lifting arm 74 is transferred to the outer tube 53 via the spring retainer 53b with the expandable force of the coil spring 90 maintained. The outer tube 53 is raised together with the lifting arm 74.

Figure 9:
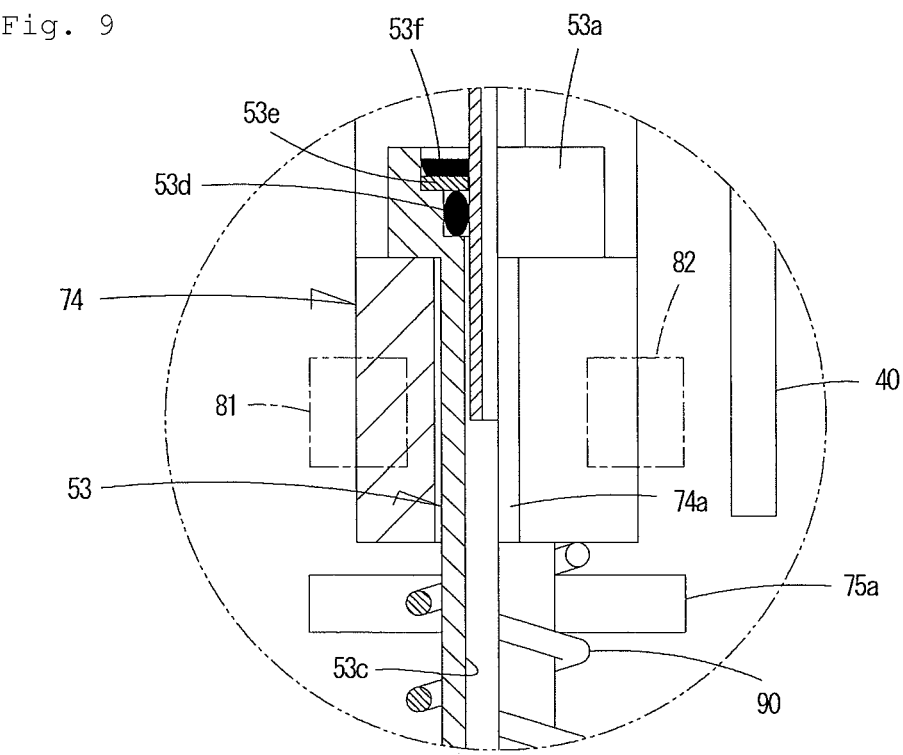
FIG. 9 is an expanded view of a portion in an upper circle denoted by a two-dot-and-dash chain line in FIG. 8.

A through-hole 53 runs through the outer tube 53 inside the outer tube 53 to supply the gas. In the vertical movement, the outer tube 53 slides along and around the inner tube 52 vertically upward and downward with the inner tube 52 remaining inserted. With reference to FIG. 9, namely, an expanded view of an upper circle defined by a two-dot-and-dash chain line in FIG. 8, the flange 53a of the outer tube 53 includes a seat for receiving an O-ring 53d, and a seat receiving a retaining ring 53e for retaining the O-ring 53d and a gasket ring 53f. Such a sealing structure keeps air-tightness of the outer tube 53 and the inner tube 52. A friction of the sealing structure makes the vertical movement of the outer tube 53 slightly less smooth. In accordance with the present embodiment, the cooperative operation between the outer tube 53 and the lifting arm 74 is reliably performed by setting appropriately the expandable force of the coil spring 90.

Figure 10:
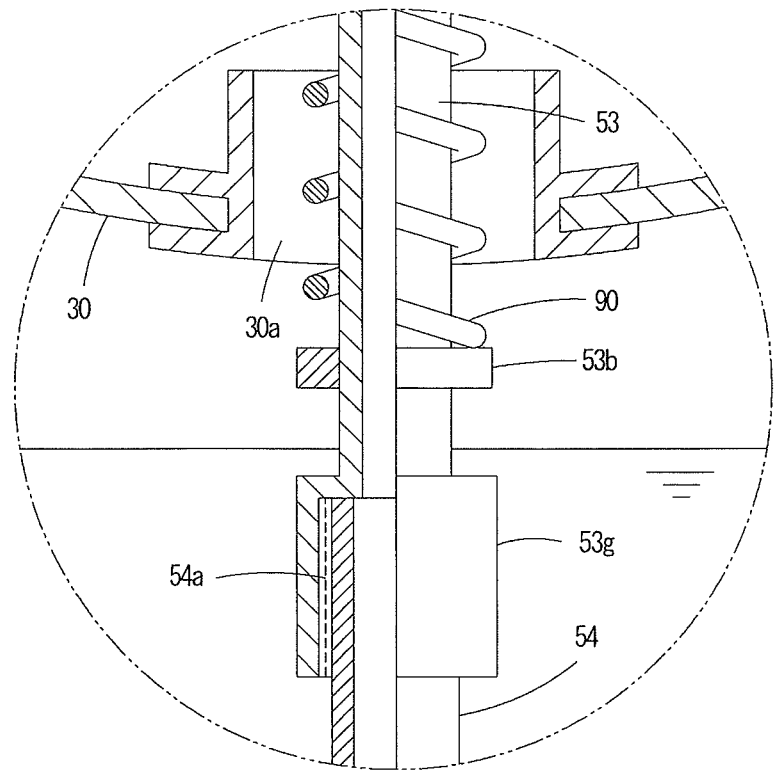
FIG. 10 is an expanded view of a portion in a lower circle denoted by a two-dot-and-dash chain line in FIG. 8.

On the other hand, a female thread portion 53g is formed at the lower end of the outer tube 53 as illustrated in FIG. 10, which is an expanded view of a lower circle defined by a two-dot-and-dash chain line in FIG. 8. A male thread portion 54a formed on the top outer circumference of the nozzle 54 is screwed into the female thread portion 53g. The nozzle 54 is thus detachably mounted to the outer tube 53. In other words, the nozzle is designed to be split into an upper part and a lower part. Alternatively in accordance with the present invention, the nozzle may be integrated with the outer tube 53 into a unitary body.

Next, the structure of detecting the start point and the lower point of the nozzle 54 is described below. Returning back to FIG. 7, a light blocking plate 74a horizontally extends at the opposed end of the rack 73 of the lifting arm 74. In conjunction with the light blocking plate 74a, photo-interrupters, each photo-interrupter including a light emitting element 81 and a light receiving element 82, are installed at two positions, an upper position and a lower position of a side bent portion 42 of the support plate 40. The light blocking plate 74a and the photo-interrupters form a transmissive position detection sensor that outputs a signal when light reception is interrupted by the light blocking plate 74a. The photo-interrupters (position detection sensors) installed at two positions, at the upper position and the lower position, detect the start point and the lower point of the vertically moving lifting arm 74, i.e., the nozzle 54 vertically movably supported by the lifting arm 74. The lower photo-interrupter of the two interrupters corresponds to the direction change switch and the open-valve switch of the electromagnetic valve 60 of the present invention, and the upper photo-interrupter corresponds to the stop switch of the present invention. Furthermore, the photo-interrupter (position detection sensor) may be reflective type. In such a case, instead of the light blocking plate 74a, a reflective plate is installed on the lifting arm 74.

In the above structure, electrical components of the vessel detection sensor, the electromagnetic valve 60, the motor 71, and the photo-interrupter (position detection sensor) are connected to a circuit board (not shown) secured to, for example, the support plate 40 in the casing 30. A driver circuit such as a photo-triac for switching the rotation of the motor 71 between a normal rotation and a reverse rotation in response to an output from the photo-interrupter (position detection sensor) is also mounted on the circuit board. More specifically, the circuit board bears a motor control circuit for starting the motor 71 so that the lifting arm 74 is lowered in response to the output from the vessel detection sensor, opening the electromagnetic valve 60 in response to an output from the lower photo-interrupter, causing the motor 71 to rotate in the reverse direction so that the lifting arm 74 is raised, and then stopping the motor 71 in response to an output from the upper photo-interrupter. Furthermore, the light emitter 32d on the base 32 is also connected to the circuit board. For example, when the motor 71 is stopped in response to the output from the upper photo-interrupter, the light emitter 32d is supplied with a current and emits light to notify of the completion of the frothing operation. The timing and period of the light emission of the light emitter 32d are set to any values.

The motor 71 may be a DC motor. However, if a synchronous motor is employed, a commercial alternating current power is used as a power supply as it is. The number of revolutions responsive to the frequency of the alternating current power is obtained and control for switching between the normal rotation and the reverse rotation is easily performed.

Figure 11:
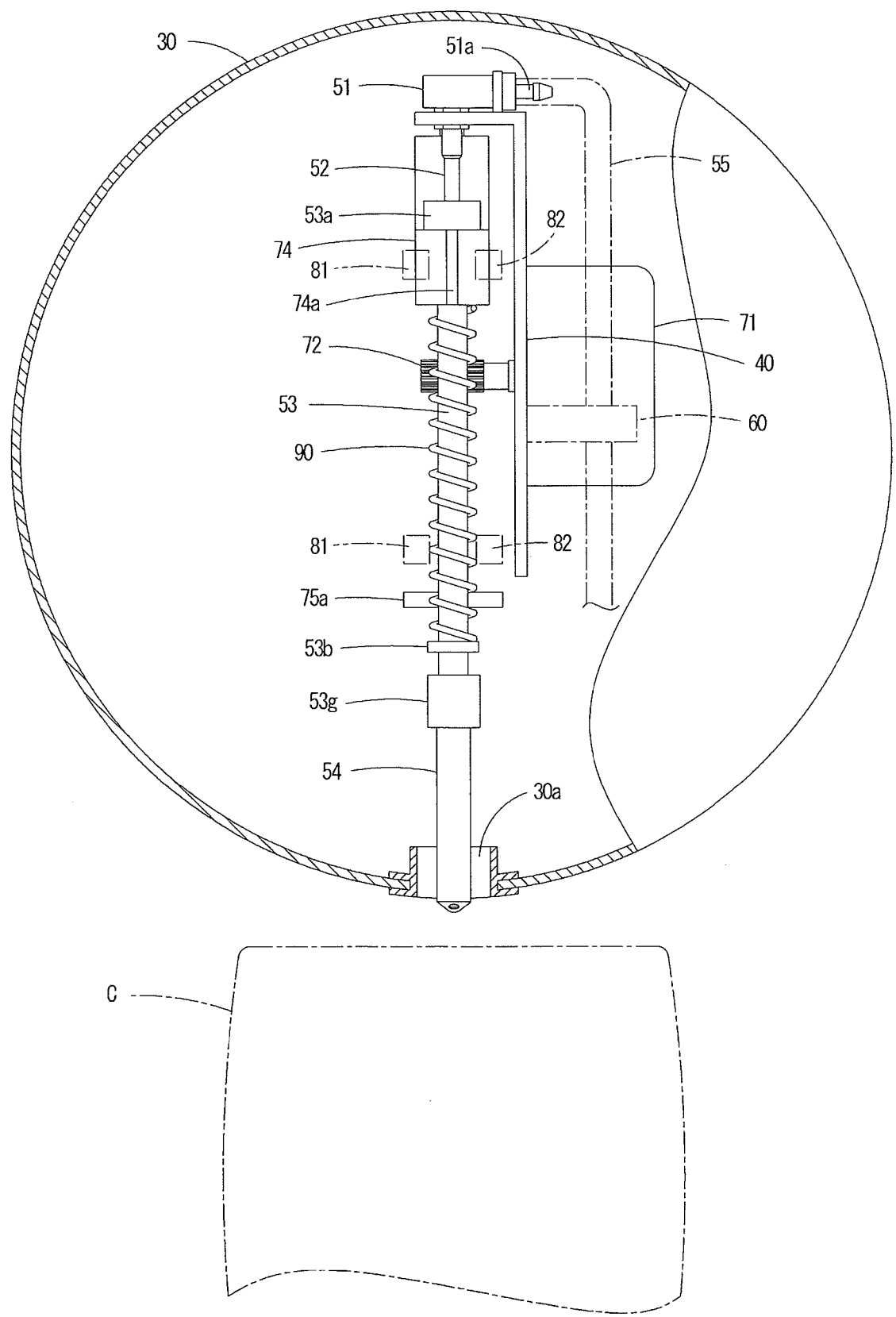
FIG. 11 is an expanded view of a major portion (start point) of the device.

In the frothing device of the embodiment thus constructed, the lifting arm 74 is at the upper position with the nozzle 54 fully retracted in the casing 30 at the initial state as illustrated in FIG. 11. A space for the vessel C is reserved right below the casing 30. When the vessel C is placed on the base 32, the vessel detection sensor installed on the base 32 or the like detects the vessel C. In accordance with the above-described motor control, the nozzle 54 is lowered until the nozzle 54 is submerged in a beverage in the vessel C. The electromagnetic valve 60 is opened at the lower point illustrated in FIGS. 7 and 8. With the gas squirted from the nozzle 54, the beverage in the vessel C is frothed. Then the nozzle 54 is raised to the initial state as illustrated in FIG. 11, and the motor 71 is stopped at the start point. The completion of the series of steps is visually recognized when the light emitter 32d is turned on.

In accordance with the present embodiment, as described above, the outer tube 53 is raised and lowered in unison with the lifting arm 74 using the expandable force of the coil spring 90. In the normal raising and lowering operations, the coil spring 90 remains unchanged in the length thereof, thereby keeping the expandable force thereof constant.

Figure 12:
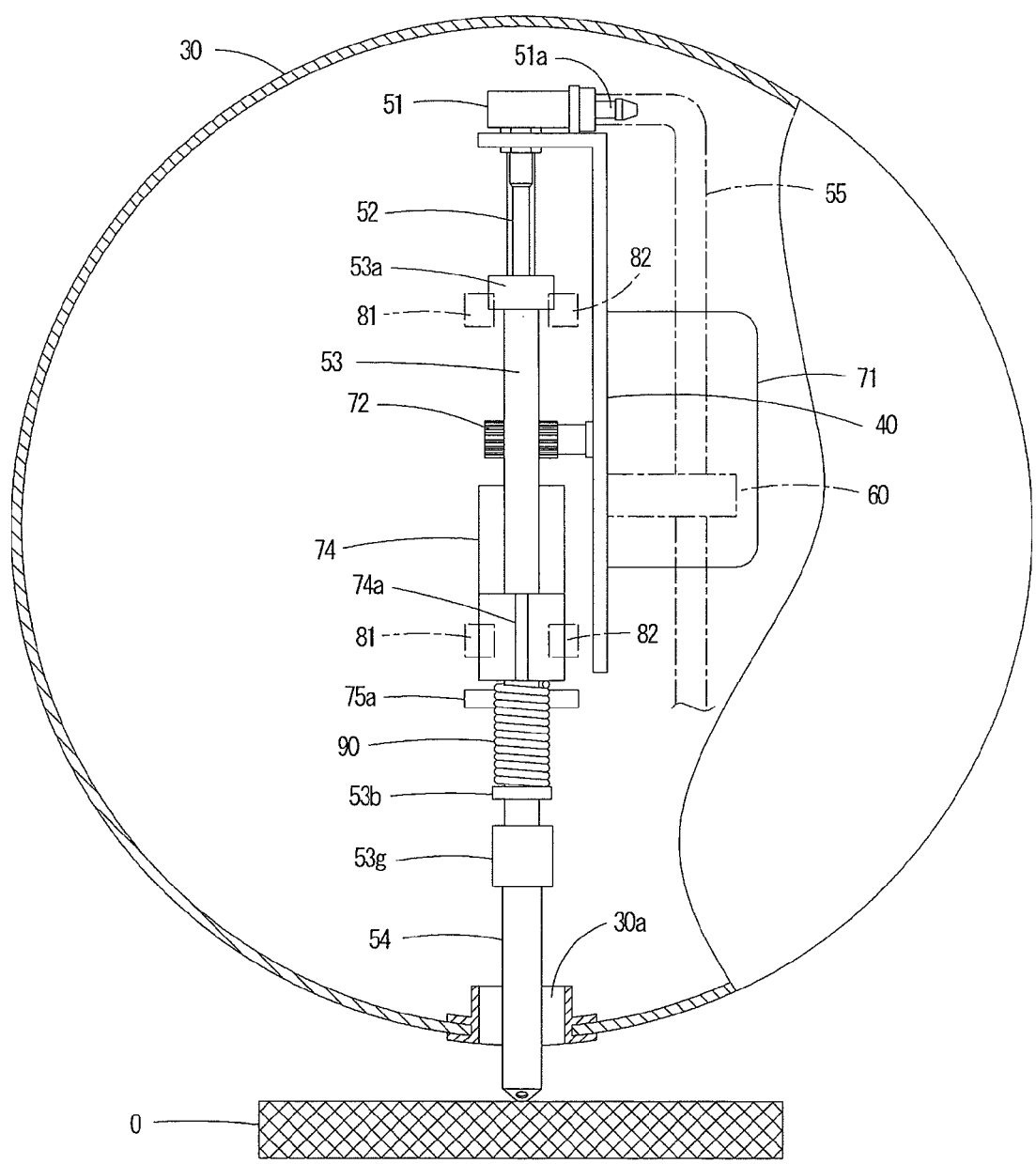
FIG. 12 illustrates an operation of the device with an obstacle present.

In contrast, if an obstacle is present right below the nozzle 54 and the nozzle 54 is blocked in the lowering operation thereof by the obstacle, the coil spring 90 is compressed to protect the nozzle 54 and the lifting mechanism as shown in FIG. 12. Even if the vessel detection sensor falsely recognizes an obstacle O for the vessel, the lifting mechanism starts the raising and lowering operations and the lifting arm 74 is lowered. In accordance with the present embodiment, the nozzle 54 can proceed or recede in an expandable manner by means of the coil spring 90. The nozzle 54 is permitted to suspend the operation thereof in response to the presence of the obstacle O, and is thus protected from damage. Even with the nozzle 54 suspended in operation, the lifting arm 74 is permitted to be lowered until the compression limit of the coil spring 90. This arrangement prevents the motor 71 from motor sticking or meshed portions of the pinion 72 and the rack 73 from being destroyed. With the lifting mechanism raised from the state in FIG. 12, the device can be restored to the normal state in FIG. 11.

Figure 13:
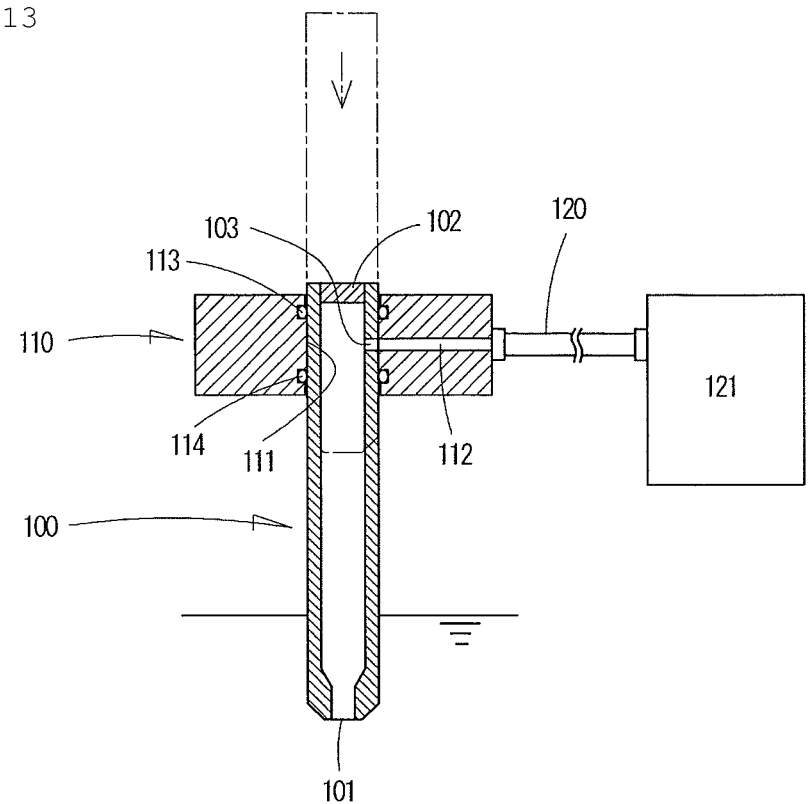
FIG. 13 illustrates a major portion of a squirting mechanism with a cutoff valve having a different structure.

FIG. 13 illustrates another structure of the cutoff valve with the squirting mechanism partly modified. A tubular structured nozzle 100 has a leading end (a lower end in FIG. 13) opened by an orifice 101 and a rear end (an upper end in FIG. 13) closed with a blocking member 102 such as a cap. The nozzle 100 has a circumference with a valve passage 103 arranged therein. The nozzle 100 is supported by a lifting mechanism (not shown) such as the above-described pinion. Any structure is acceptable for the lifting mechanism as long as the lifting mechanism vertically movably supports the nozzle 100.

A valve casing 110 includes a slide hole 111 through which the nozzle 100 is vertically movable and a gas passage 112 opened to the slide hole 111 for communication with the valve passage 103 of the nozzle 100. The slide hole 111 is loaded with two O-rings 113 and 114, one above and the other below the gas passage 112, so that the nozzle 100 is passed through in an air-tight fashion. Only when the nozzle 100 reaches the lower point in the beverage, the valve passage 103 communicates with the gas passage 112 of the valve casing 110 to squirt the gas. The other end of the gas passage 112 is connected to a gas supply 121 via a connection tube 120.

Since the nozzle 100 itself functions as a valve casing in the above arrangement, it is not necessary to arrange newly a cutoff valve. Furthermore, the gas passage is automatically opened and closed in the course of the raising and lowering operations of the nozzle 100. This arrangement provides a rational structure.

Figure 14:
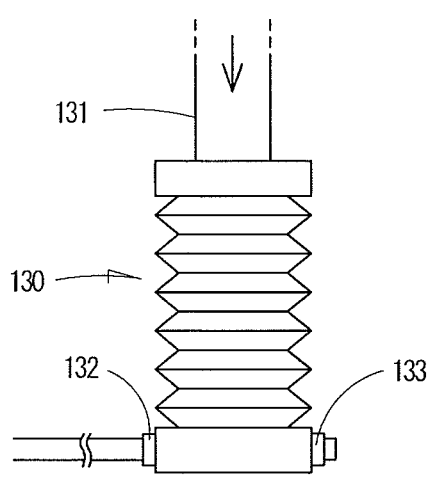
FIG. 14 illustrates another structure of a supply source of a pressurized gas.

In the above discussion, the supply source of the pressurized gas is a pressure container into which a pressurized gas is stored, such as a carbon dioxide cylinder. An electric air pump may be used instead. Furthermore, as shown in FIG. 14, an accordion-type pump 130 for use in feeding air into an inner tube is used. Using the accordion-type pump 130, air may be force-supplied by operating a trudging bar 131 that is vertically movable in unison with the lifting mechanism. The accordion-type pump 130 includes an air feed valve 132 and an intake valve 133, each being a check valve.

Industrial Applicability

The present invention is applicable to frothing beer. If a pressurized gas is a carbon dioxide gas, the present invention is used to generate carbonated water having a small amount of carbonic acid by squirting the carbon dioxide gas into water. If applied to whiskey and water or shochu and water, whisky and soda with slight carbonic acid or shochu and soda with slight carbonic acid are made.

The present invention is not limited to the namesake object, and is also applicable to an arrangement that intends to carbonate a water solution.

The invention claimed is:

1. A beer frothing device for frothing beer poured in a vessel by squirting a pressurized gas through a nozzle into the beer with the nozzle submerged in the beer, the device comprising:
a pressurized gas supply;
a squirting mechanism connected to the gas supply and having the nozzle for squirting the gas;
a lifting mechanism having a threaded bar configured to threadably connect with the squirting mechanism, the threaded bar being rotatable to move the squirting mechanism in a manner such that the squirting mechanism is raised and lowered in a vertically reciprocating movement with a half track between a start point, at which the nozzle is positioned right above the vessel, and a lower point, at which the nozzle is submerged at a predetermined depth in the beer poured in the vessel;
a start switch configured to activate the lowering of the squirting mechanism; and
a cutoff valve for cutting off, in a normally closed state, the squirting of the gas through the nozzle, the cutoff valve being configured to automatically open when the nozzle reaches a preset submerge position in the beer poured in the vessel in the movement of the squirting mechanism to automatically introduce gas into the beer.

2. The beer frothing device according to claim 1, wherein the cutoff valve is contained in the squirting mechanism, wherein the beer frothing device comprises an open-close lever protruding in the reciprocating track of the squirting mechanism, and wherein an open- valve switch is ready to open the cutoff valve in response to a contact of the open-valve switch with the lever.

3. The beer frothing device according to claim 2, wherein the cutoff valve is normally closed by expandable urging and wherein the open-valve switch is ready to open the cutoff valve against the expandable urging only when the open-valve switch is placed into contact with the lever.

4. The beer frothing device according to claim 2, wherein the cutoff valve is ready to be opened and closed when the lever is toggled up and down and wherein the open-valve switch is placed into contact with the lever once during a lowering operation of the squirting mechanism and once during a raising operation of the squirting mechanism to open and close the cutoff valve.

5. The beer frothing device according to claim 1, wherein the cutoff valve is an electromagnetic valve.

6. The beer frothing device according to claim 1, wherein the cutoff valve comprises the nozzle having a leading end opened, a trailing end closed and a circular wall with a valve orifice on part thereof, and a valve casing having a slide hole that allows the nozzle to pass therethrough in an air-tight manner and a gas passage opened to the slide hole in a manner communicable with the valve orifice.

7. The beer frothing device according to claim 2, further comprising a direction change switch for detecting the lower point in a lowering operation of the squirting mechanism and then raising the squirting mechanism, and a stop switch for detecting the start point in a raising operation and then stopping the squirting mechanism.

8. The beer frothing device according to claim 7, wherein each of the direction change switch and the stop switch is a limit switch having an actuator arranged to protrude into the reciprocating track of the squirting mechanism.

9. The beer frothing device according to claim 7, wherein each of the direction change switch and the stop switch is a photo-interrupter.

10. The beer frothing device according to claim 7, wherein at least one of the direction change switch, the stop switch, and the open-valve switch is adjustable at the height thereof to any height.

11. The beer frothing device according to claim 1, wherein the squirting mechanism causes the nozzle to proceed or recede from the squirting mechanism in an expandable manner.

12. The beer frothing device according to claim 1, wherein the squirting mechanism and the lifting mechanism are housed in a casing supported by an arm standing on a base.

13. The beer frothing device according to claim 12, wherein the start switch is a detection sensor installed on one of the base and the arm.

14. The beer frothing device according to claim 12, wherein a light emitter is arranged on the base.

15. The beer frothing device according to claim 1, wherein the supply source of the pressurized gas is obtained by branching and depressurizing a carbon dioxide gas for an existing beer server machine.

16. The beer frothing device according to claim 1, wherein the supply source of the pressurized gas is an accordion-type air pump force supplying air in unison with a lowering operation of the squirting mechanism.

* * * * *